(12) United States Patent
Agirman

(10) Patent No.: US 11,482,920 B2
(45) Date of Patent: Oct. 25, 2022

(54) SINGLE STAGE, TWO LEVEL PULSE WIDTH MODULATION STRATEGIES FOR ACTIVE HARMONIC FILTERS

(71) Applicant: Carrier Corporation, Palm Beach Gardens, FL (US)

(72) Inventor: Ismail Agirman, Southington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/734,181

(22) PCT Filed: Oct. 30, 2019

(86) PCT No.: PCT/US2019/058848
§ 371 (c)(1),
(2) Date: Dec. 1, 2020

(87) PCT Pub. No.: WO2020/101896
PCT Pub. Date: May 22, 2020

(65) Prior Publication Data
US 2021/0367503 A1    Nov. 25, 2021

Related U.S. Application Data

(60) Provisional application No. 62/760,165, filed on Nov. 13, 2018.

(51) Int. Cl.
*H02M 1/12* (2006.01)
*H02P 29/50* (2016.01)
(Continued)

(52) U.S. Cl.
CPC ......... *H02M 1/12* (2013.01); *H02M 7/53871* (2013.01); *H02P 27/08* (2013.01); *H02P 29/50* (2016.02)

(58) Field of Classification Search
CPC ...... H02P 1/00; H02P 1/04; H02P 1/16; H02P 1/163; H02P 1/18; H02P 1/26;
(Continued)

(56) References Cited

U.S. PATENT DOCUMENTS

| | | | |
|---|---|---|---|
| 4,904,918 | A | 2/1990 | Bailey et al. |
| 5,905,642 | A | 5/1999 | Hammond |

(Continued)

FOREIGN PATENT DOCUMENTS

| | | |
|---|---|---|
| CN | 105932677 A | 9/2016 |
| KR | 101309290 B1 | 9/2013 |

(Continued)

OTHER PUBLICATIONS

Asiminoaei, L. et al. "Application of Discontinuous PWM Modulation in Active Power Filters", IEEE Transaction of Power Electronics, vol. 23, No. 4, Jul. 2008, pp. 1692-1706.
(Continued)

*Primary Examiner* — Antony M Paul
(74) *Attorney, Agent, or Firm* — Cantor Colburn LLP

(57) ABSTRACT

A system (110) and method of controlling a three-phase active harmonic filter (160) with a three-phase converter having inputs for connection to a three-phase AC source (112), the three-phase converter having three phase legs, each phase leg of the three phase legs of the three-phase converter includes a first switching device operably connected to a first power supply rail and a second switching device operably connected to a second supply rail, the three-phase converter operably connected to a controller. The controller is configured to determine an operating characteristic of the AHF and operable to control the first and second switching devices of each phase leg of the three phase legs with a first PWM strategy, compare the operational characteristic of the AHF to a selected threshold, and
(Continued)

employ a second PWM strategy if the operational characteristic exceeds a selected threshold.

13 Claims, 9 Drawing Sheets

(51) Int. Cl.
*H02M 7/5387* (2007.01)
*H02P 27/08* (2006.01)

(58) Field of Classification Search
CPC .... H02P 1/426; H02P 3/00; H02P 3/14; H02P 4/00; H02P 5/00; H02P 6/00; H02P 6/12; H02P 6/28; H02P 6/15; H02P 7/29; H02P 9/00; H02P 9/102; H02P 21/00; H02P 21/13; H02P 21/22; H02P 21/34; H02P 23/00; H02P 27/00; H02P 27/04; H02P 27/08; H02P 27/085; G05B 11/28
See application file for complete search history.

(56) References Cited

U.S. PATENT DOCUMENTS

| | | | |
|---|---|---|---|
| 6,009,004 A | 12/1999 | Swamy | |
| 7,190,143 B2 * | 3/2007 | Wei | H02M 7/219 318/807 |
| 7,391,181 B2 | 6/2008 | Welchko et al. | |
| 7,400,518 B2 | 7/2008 | Yin et al. | |
| 7,535,125 B2 | 5/2009 | Shudarek | |
| 7,755,342 B2 | 7/2010 | Chen et al. | |
| 7,888,924 B2 | 2/2011 | Tran et al. | |
| 8,390,149 B2 | 3/2013 | Fredette et al. | |
| 9,054,586 B2 * | 6/2015 | Wei | H02M 7/217 |
| 9,093,946 B2 | 7/2015 | Kim | |
| 9,236,828 B1 * | 1/2016 | Wei | H02P 27/08 |
| 9,369,071 B2 | 6/2016 | Wang et al. | |
| 9,543,885 B2 | 1/2017 | Saha et al. | |
| 9,590,540 B2 | 3/2017 | Wu et al. | |
| 9,621,102 B2 | 4/2017 | Itani | |
| 9,654,049 B2 | 5/2017 | West et al. | |
| 9,716,444 B2 | 7/2017 | Wagoner et al. | |
| 9,728,962 B2 | 8/2017 | Hasler et al. | |
| 9,819,283 B2 | 11/2017 | Mahdavikhah et al. | |
| 10,381,968 B2 * | 8/2019 | Agirman | H02M 7/5395 |
| 10,523,130 B2 * | 12/2019 | Bax | H02M 7/487 |
| 2007/0216344 A1 | 9/2007 | Welchko et al. | |
| 2015/0327399 A1 | 11/2015 | West et al. | |
| 2017/0264185 A1 | 9/2017 | Karlsson et al. | |

FOREIGN PATENT DOCUMENTS

| | | |
|---|---|---|
| WO | 2011124223 A2 | 10/2011 |
| WO | 2018098974 A1 | 6/2018 |

OTHER PUBLICATIONS

International Search Report and Written Opinion for International Application PCT/US2019/058848 International Filing Date: Oct. 30, 2019; dated Feb. 12, 2020; 22 pages.

Jennela, S. et al. "THD Analysis of One-Cycle and PWM Controlled Active Power Filters", International Journal of Innovative Research in Science, Engineering and Technology, vol. 3, Special Issue 1, Feb. 2014, pp. 900-907.

Thomas, F. et al., "Harmonic Compensation for Non Linear Load Using PWM Based Active Filter," Proc. of Inf. Conf. on Advances in Recent Technologies in Electrical and Electronics, ACEEE (2013) pp. 37-40.

\* cited by examiner

FIG. 1 - Prior Art

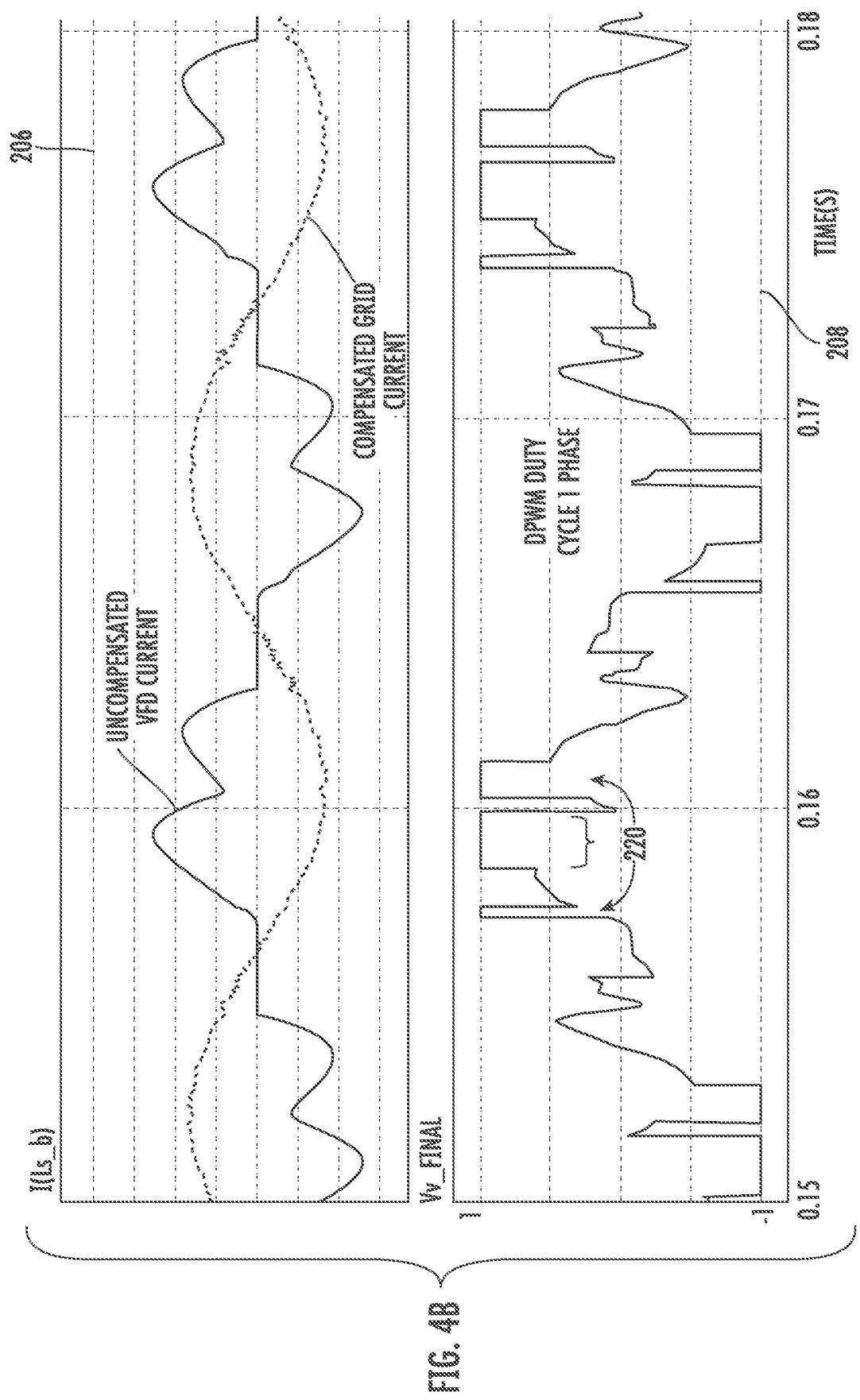

SINGLE STAGE, TWO LEVEL PULSE WIDTH MODULATION STRATEGIES FOR ACTIVE HARMONIC FILTERS

CROSS REFERENCE TO RELATED APPLICATIONS

This application is a National Stage application of PCT/US2019/058848, filed Oct. 30, 2019, which claims the benefit of priority to U.S. Provisional Application 62/760,165, filed Nov. 13, 2018, both of which are incorporated by reference in their entirety herein.

TECHNICAL FIELD

The subject matter disclosed herein relates generally to drive systems and more particularly active harmonic filters employed with drives systems selectively employing multiple pulse width modulation (PWM) techniques to control an active harmonic filter and reduce switching losses.

BACKGROUND

Electric motors are well known and widely used. They come in a variety of sizes and styles. One example use of an electric motor is in a heating ventilation, air conditioning or refrigeration systems (HVACR). Another example may be in an elevator machine that moves a drive sheave for propelling an elevator cab up or down through a hoistway. Other examples may include actuation systems driven by motors.

When a sinusoidal voltage is applied to a non-linear load, such as a rectifier or passive front end converter of the VFD, the current drawn by the load is non-sinusoidal. Instead, the current waveform is complex and consists of a series of multiple sinusoidal signals that start at the fundamental frequency of the power system and occur at integer multiples of the fundamental frequency known as harmonics. Harmonic frequencies in a power system are a frequent cause of power quality problems. In addition, power systems designed to function at the fundamental frequency of the system may experience unsatisfactory operation and/or failure when subjected to voltages and currents that contain substantial harmonic elements.

A variable frequency drive is a solid state electronic power converting device used for controlling the rotational speed of an alternating current (AC) electrical motor by controlling the frequency of the electrical power supplied to the motor (as is known, the synchronous speed of an AC motor is determined by the frequency of the AC supply and the number of poles in the stator winding). Typically, a variable frequency drive first converts an AC input power to a DC intermediate power using a rectifier circuit. The DC intermediate power is then converted to a quasi-sinusoidal AC power using an inverter switching circuit. As noted above, variable frequency drives usually include rectifiers or passive front end converters in their front ends. As also noted above, rectifiers, being non-linear, produce harmonics and, sometimes, reactive power. It is desirable to have filters between the voltage sources and the rectifiers so that the sources are protected from damage by the harmonics and/or reactive power. Traditionally, passive filters have been used for this purpose where they have been tuned to certain harmonic frequencies so that they behave as harmonic sinks. At the same time, the passive filters provide reactive power naturally, although the amount of the reactive power they provide is typically not enough to provide effective compensation for the reactive power described above. While a passive filter performs well in filtering a particular order of harmonics, it tends to couple with the power line impedance to form an oscillation circuit and thus introduces oscillating current.

Recently, active filters have also been used for this purpose. Active Harmonic Filters (AHF) use power electronic devices, such as electronic switches like Insulated Gate Bipolar Transistors (IGBTs), and switch them on and off intelligently so that they compensate for the harmonic current(s) and reactive power. In one configuration, the AHF injects current that is 180 degrees out of phase from the load harmonic current to compensate for that harmonic current. A hybrid filter is one that combines active harmonic filter schemes to compensate for harmonics generated by a non-linear load, while they also employ passive filters to filter high-order harmonics. Typically hybrid filter schemes have been included as part of the VFD or separately provided with parallel passive components. While the approaches described above have been effective in some applications, there is room for improvement in the area of harmonic filtering, reactive power compensation and/or oscillation dampening and efficiency for power systems, particularly in high power applications where the switching losses for the electronic power switching devices used therein is one of the driving factors.

BRIEF SUMMARY

According to an embodiment, described herein is a system and method of controlling a three-phase active harmonic filter with a three-phase converter having inputs for connection to a three-phase AC source, the three-phase converter having three phase legs, each phase leg of the three phase legs of the three-phase converter includes a first switching device operably connected to a first power supply rail and a second switching device operably connected to a second supply rail, the three-phase converter operably connected to a controller. The controller is configured to determine a operating characteristic of the AHF and operable to control the first and second switching devices of each phase leg of the three phase legs with a first PWM strategy, compare the operational characteristic of the AHF to a selected threshold, and employ a second PWM strategy if the operational characteristic exceeds a selected threshold.

In addition to one or more of the features described above or below, or as an alternative, further embodiments could include that the first PWM strategy is one of space vector PWM (SVPWM), Discontinuous (DPWM), a first hybrid discontinuous PWM (DPWM_1), a second hybrid discontinuous PWM (DPWM_0), an alternating combination of the DPWM_1 and the DPWM_0.

In addition to one or more of the features described above or below, or as an alternative, further embodiments could include that the second PWM strategy is another of the space vector PWM (SVPWM), the Discontinuous (DPWM), the first hybrid discontinuous PWM (DPWM_1), the second hybrid discontinuous PWM (DPWM_0), the alternating combination of the DPWM_1 and the DPWM 0.

In addition to one or more of the features described above or below, or as an alternative, further embodiments could include that the first hybrid discontinuous PWM (DPWM_1) includes the second switching device is fully turned off while the first switching device is fully turned on during the PWM period for a selected phase leg, and the second hybrid discontinuous PWM (DPWM_0) includes the first switching device is fully turned off while the second switching device is fully on during the PWM period for a selected phase leg.

In addition to one or more of the features described above or below, or as an alternative, further embodiments could include that the alternating is based on a time duration associated with the three-phase AC power.

In addition to one or more of the features described above or below, or as an alternative, further embodiments could include that the second PWM strategy provides for an AHF that is about 30 percent more efficient than a conventional three-phase 2 level AHF employing space vector PWM techniques alone.

In addition to one or more of the features described above or below, or as an alternative, further embodiments could include that the operational characteristic includes at least one of a harmonic current loading on the AHF and a temperature of a switching device in the AHF.

In addition to one or more of the features described above or below, or as an alternative, further embodiments could include that the selected threshold is based on at least one of AHF total RMS current going above its nominal rating, or its heat sink temperature going above its maximum designed value due to increased ambient temperature conditions.

Also described herein in another embodiment is a three-phase motor control system with an active harmonic filter employing multiple pulse width modulation (PWM) strategies. The motor control system includes a three-phase variable frequency drive operably connected to a three-phase AC power source, a motor operably connected to the three-phase variable frequency drive, the three-phase variable frequency drive configured to formulate and provide command signals to the motor; and a three-phase active harmonic filter operably connected to the three-phase AC power source, the three-phase active harmonic filter employing a plurality of PWM strategies.

In addition to one or more of the features described above or below, or as an alternative, further embodiments could include that the three-phase active harmonic filter includes a three-phase converter having inputs for connection to the three-phase AC source, the three-phase converter having three phase legs, wherein each phase leg of the three phase legs of the three-phase converter includes a first switching device operably connected to a first power supply rail and a second switching device operably connected to a second supply rail and a controller operably connected to the three-phase converter. The controller is configured to determine an operational characteristic of the AHF and operable to control the first and second switching devices of each phase leg of the three phase legs with a first PWM strategy, compare the operation characteristic of the AHF to a selected threshold, and employ a second PWM strategy if the operational characteristic exceeds a selected threshold.

In addition to one or more of the features described above or below, or as an alternative, further embodiments could include that the first PWM strategy is one of space vector PWM (SVPWM), Discontinuous (DPWM), a first hybrid discontinuous PWM (DPWM_1), a second hybrid discontinuous PWM (DPWM_0), an alternating combination of the DPWM_1 and the DPWM_0.

In addition to one or more of the features described above or below, or as an alternative, further embodiments could include that the second PWM strategy is another of the space vector PWM (SVPWM), the Discontinuous (DPWM), the first hybrid discontinuous PWM (DPWM_1), the second hybrid discontinuous PWM (DPWM_0), and the alternating combination of the DPWM_1 and the DPWM 0.

In addition to one or more of the features described above or below, or as an alternative, further embodiments could include that the first hybrid discontinuous PWM (DPWM_1), includes the second switching device is fully turned off while the first switching device is fully turned on during the PWM period for a selected phase leg, and the second hybrid discontinuous PWM (DPWM_0) includes the first switching device is fully turned off while the second switching device is fully turned on during the PWM period for a selected phase leg.

In addition to one or more of the features described above or below, or as an alternative, further embodiments could include that the alternating is based on a time duration associated with the three-phase AC power.

In addition to one or more of the features described above or below, or as an alternative, further embodiments could include a filter interposed between the three-phase AHF and the three-phase variable frequency drive.

In addition to one or more of the features described above or below, or as an alternative, further embodiments could include that the second PWM strategy provides for an AHF that is about 30 percent more efficient than a conventional three-phase 2 level AHF employing space vector PWM techniques alone.

In addition to one or more of the features described above or below, or as an alternative, further embodiments could include that the operational characteristic includes at least one of a harmonic current loading on the AHF and a temperature of a switching device in the AHF.

In addition to one or more of the features described above or below, or as an alternative, further embodiments could include that the selected threshold is based on at least one of AHF total RMS current going above its nominal rating, or its heat sink temperature going above its maximum designed value due to increased ambient temperature conditions.

Also described herein, in yet another embodiment is a method of controlling a three-phase active harmonic filter with a three-phase converter having inputs for connection to a three-phase AC source, the three-phase converter having three phase legs, wherein each phase leg of the three phase legs of the three-phase converter includes a first switching device operably connected to a first power supply rail and a second switching device operably connected to a second supply rail, the three-phase converter operably connected to a controller. The controller is configured to: determine an operational characteristic the AHF and operable to control the first and second switching devices of each phase leg of the three phase legs with a first PWM strategy, compare the operational characteristic on the AHF to a selected threshold, and employ a second PWM strategy if the operational characteristic exceeds the selected threshold.

In addition to one or more of the features described above or below, or as an alternative, further embodiments could include that the first PWM strategy is one of space vector PWM (SVPWM), Discontinuous (DPWM), a first hybrid discontinuous PWM (DPWM_1), a second hybrid discontinuous PWM (DPWM_0), an alternating combination of the DPWM_1 and the DPWM_0.

In addition to one or more of the features described above or below, or as an alternative, further embodiments could include that the second PWM strategy is another of the space vector PWM (SVPWM), the Discontinuous (DPWM), the first hybrid discontinuous PWM (DPWM_1), the second hybrid discontinuous PWM (DPWM_0), the alternating combination of the DPWM_1 and the DPWM_0.

In addition to one or more of the features described above or below, or as an alternative, further embodiments could include that the first hybrid discontinuous PWM (DPWM_1), includes turning the second switching device fully off while turning the first switching device is fully on during the PWM period for a selected phase leg, and the second hybrid discontinuous PWM (DPWM_0) includes turning the first switching device fully off while the second switching device is turned fully on during the PWM period for a selected phase leg.

In addition to one or more of the features described above or below, or as an alternative, further embodiments could include that the alternating is based on a time duration associated with the three-phase AC power.

In addition to one or more of the features described above or below, or as an alternative, further embodiments could include that the second PWM strategy provides for an AHF that is about 30 percent more efficient than a conventional three-phase 2 level AHF employing space vector PWM techniques alone.

In addition to one or more of the features described above or below, or as an alternative, further embodiments could include that the operational characteristic includes at least one of a harmonic current loading on the AHF and a temperature of a switching device in the AHF.

In addition to one or more of the features described above or below, or as an alternative, further embodiments could include that the selected threshold is based on at least one of AHF total RMS current going above its nominal rating, or its heat sink temperature going above its maximum designed value due to increased ambient temperature conditions.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The described subject matter is particularly pointed out and distinctly claimed in the claims at the conclusion of the specification. The foregoing and other features, and advantages are apparent from the following detailed description taken in conjunction with the accompanying drawings in which:

FIG. 4B is diagram and graph of an AHF correction current, the compensated three-phase current, and a PWM waveform for DPWM in accordance with an embodiment;

DETAILED DESCRIPTION

Figure 1:
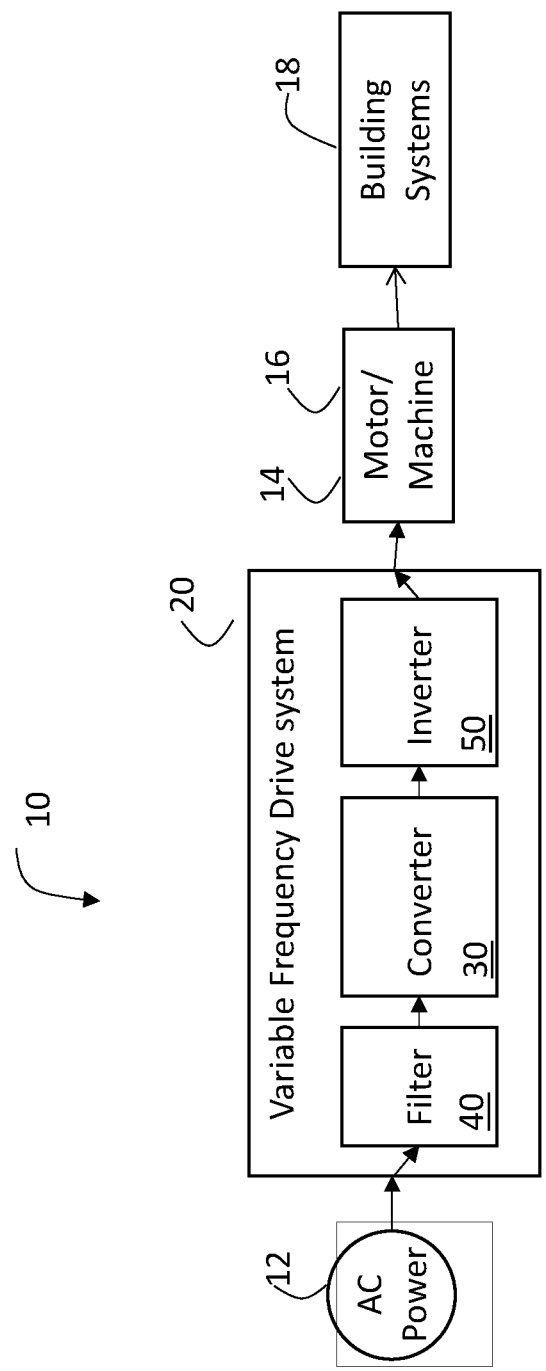
FIG. 1 is a block diagram of components of a motor drive system.

In general, embodiments herein relate to an AHF. In some embodiments, the AHF is also a hybrid harmonic filter that combines active harmonics regulation elements with an optional passive element that consists of three-phase AC reactor in the same packaging. The AHF is configured to be introduced between an AC power source and a VFD and to reduce the total harmonic distortion ( ) and limit the harmonic currents on the VFD input. Active harmonic filters are employed to limit harmonic currents generated by a VFD from being directed to the grid. In some instances using and AHF provides significant cost benefits and application flexibility for high tier VFD product applications and facilitates application to many commercial VFDs applications. One significant advantage is that the cost of the AHF as employed to reduce harmonic currents is generally much lower when compared to the cost of a larger/higher current rated VFD.

Embodiments herein are directed to a system controller providing three-phase AC power to a VFD in a motor drive application. Embodiments herein set forth pulse width modulation (PWM) techniques as may be employed by an AHF, operably connected in series in advance of the VFD, and motor system operating from a three-phase AC power source. Embodiments herein are also directed to configuring and controlling the AHF pulse width modulation (PWM) techniques under selected conditions. Embodiments herein also set forth a drive and motor system and/or method for a converter to actively control a DC voltage typically generated from an AC side sinusoidal current. The DC voltage is employed to generate AC excitation voltage using fast switching of power electronics devices to control a motor. Unfortunately, such operation and switching of power electronics devices in the VFD also generates harmonic currents and electromagnetic interference (EMI), which can pose potential problems for nearby and connected components. Reducing EMI and harmonic currents helps ensure that other electronic components are not impacted by the operation of the VFD.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Likewise, where a given element is part of a plurality, then the suffice "a", "b", "n" may be employed. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Further, in another embodiment a three-phase drive is used to drive a motor in a heating ventilation and air conditioning or refrigeration system HVAC/R system. The conventional HVAC/R system incorporates a closed refrigerant loop in a vapor compression cycle. The vapor-compression cycle uses a circulating refrigerant as the medium which absorbs and removes heat from the space to be cooled and subsequently rejects that heat elsewhere. All such systems have four basic components: a compressor, a condenser, a thermal expansion valve (also called a throttle valve or metering device), and an evaporator. In large scale HVAC systems or chillers, the compressor is large and driven by a very large motor requiring dedicated motor drives such as described herein with high voltage and current capabilities. In some instances the drive may include a converter that is a three-phase active front-end. The drive may also include a power electronics inverter (e.g., as a variable speed alternating current (AC) motor drive) to improve the performance of the chiller system. In an embodiment, a three-phase active converter operating from a three-phase excitation and three-phase inverter is used to drive a motor is disclosed. In another embodiment, a three-phase drive operating from a three-phase AC source is utilized in an electric motor system or power system as part of a building system. The electric motor system utilizes the power electronics inverter (e.g., as variable speed alternating drive (AC) motor drive) to improve the performance of controlling compressors, blowers, fans and the like. Other applications and embodiments include powers systems for trains, boats, planes, etc.

FIG. 1 is a block diagram of components of a power system 10 as may be employed to power one or more building systems or loads 18. The power system 10 is described with respect to a HVAC system, however application to any system where a motor drive is employed may be envisioned. Power system 10 includes a source of AC power 12, such as an electrical main line (e.g., 440/220 volt, 1-phase). The AC power 12 is provided to a drive system 20. In addition, the drive system 20 may be configured as a conventional three-phase drive operating from a three-phase AC power source 12. The drive 20 may include a filter 40 configured to: limit inrush currents, stabilize voltage levels, and suppress electromagnetic interference (EMI). The drive 20 may also include a converter 30 to convert the AC power 12 to a DC voltage. Each drive 20 also includes an inverter 50 to convert the DC voltage to multiphase, AC drive signals. Drive signals from the inverter 50 of the drive system 20 are supplied to a multiphase machine 14 to control a building system 18. In an exemplary embodiment, machine 14 includes a multiphase, permanent magnet synchronous motor 16.

Figure 2:
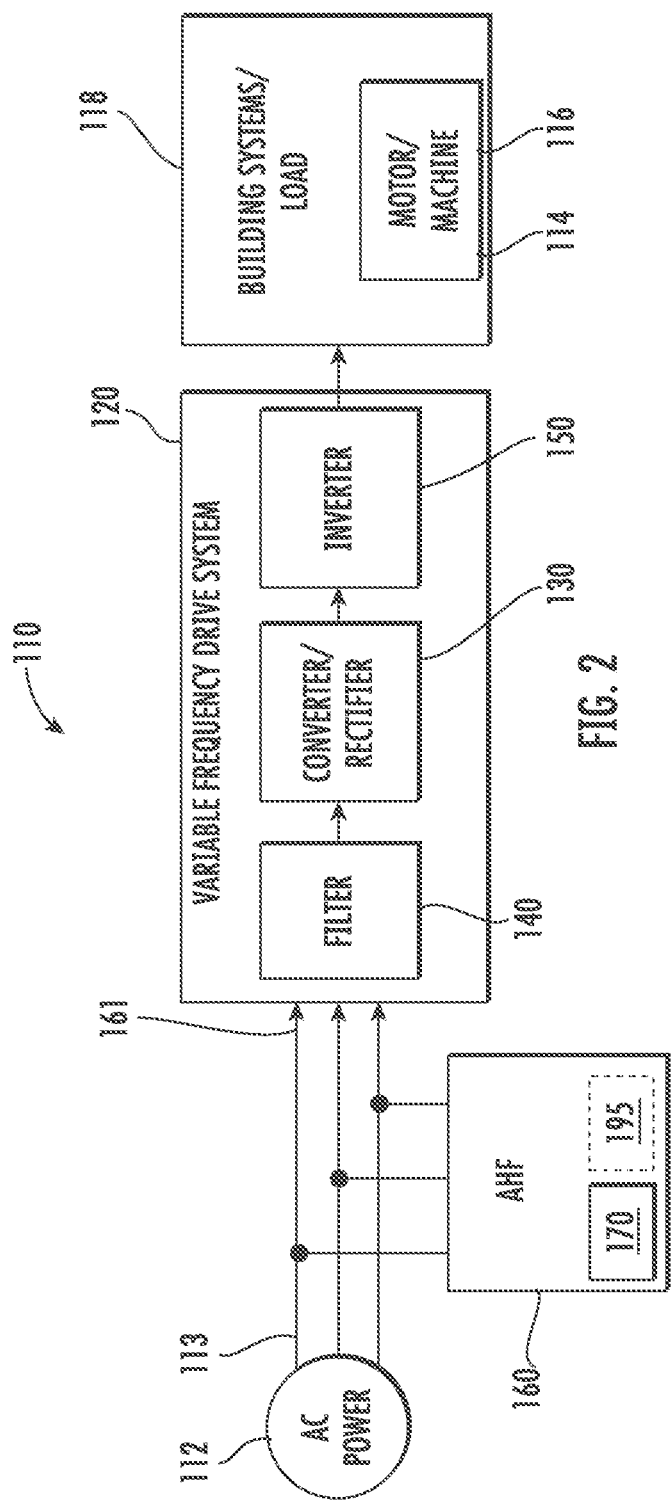
FIG. 2 is a simplified block diagram of a three-phase drive with harmonic filter in accordance with an embodiment.

FIG. 2 is a block diagram of components of a power system 110 as may be employed in accordance with one or more embodiments to power one or more building systems or loads 118. Once again, the power system 110 is described with respect to a HVAC/R system, however application to any system where a motor drive is employed may be envisioned. Power system 110 includes a source 112 of AC power 113, such as an electrical main line (e.g., 440/220 volt, 3-phase). The AC power 113 is provided by the AC power source 112 to Active Harmonic Filter (AHF) 160. The AHF 160 includes an AHF 170 operably connected in parallel with the AC power 113 and configured to compensate for harmonic distortion caused by a downstream load form being transmitted back to the AC power 113 and ultimately the AC power source 112. The AHF 160 optionally also includes a passive three-phase filter 195 operably connected in series between the AC power 112 and the output of the AHF 160, the optional passive three-phase filter 195 is configured to reduce harmonic currents, limit current transients, stabilize voltage levels, and suppress electromagnetic interference (EMI) from being reflected/transmitted back to the AC power source 112. The output of the AHF 160 is a compensated three-phase AC power 161, which is then connected to the drive system 120 (e.g., a VFD.

Power system 110 also include a drive system 120, which may be configured as a conventional three-phase drive operating from a three-phase power as supplied and compensated by the AHF 160. As described above, the drive 120 may include a filter 140 configured to limit inrush currents, stabilizes voltage levels and suppress electromagnetic interference (EMI). The drive system 120 may also include a converter 130 to convert the (compensated) AC power 161 (as supplied from the AHF 160) to a DC voltage. Each drive 120 also includes an inverter 150 to convert the DC voltage to multiphase, AC drive signals. Drive signals from the inverter 150 of the drive system 120 are supplied to a multiphase machine 114 to control a building system 118. For example, a motor 116 to drive a chiller compressor as part of the building system 118. In an exemplary embodiment, machine 114 includes a multiphase, permanent magnet synchronous motor 116. It should be appreciated, that while the embodiments herein are described primarily with reference to an HVAC/R system and their applications, this description is for example only. The embodiments described here are readily applied to any application employing a three-phase drive and three-phase motor 116 including HVAC, refrigeration, elevators, and any other power system and motor control application.

Figure 3:
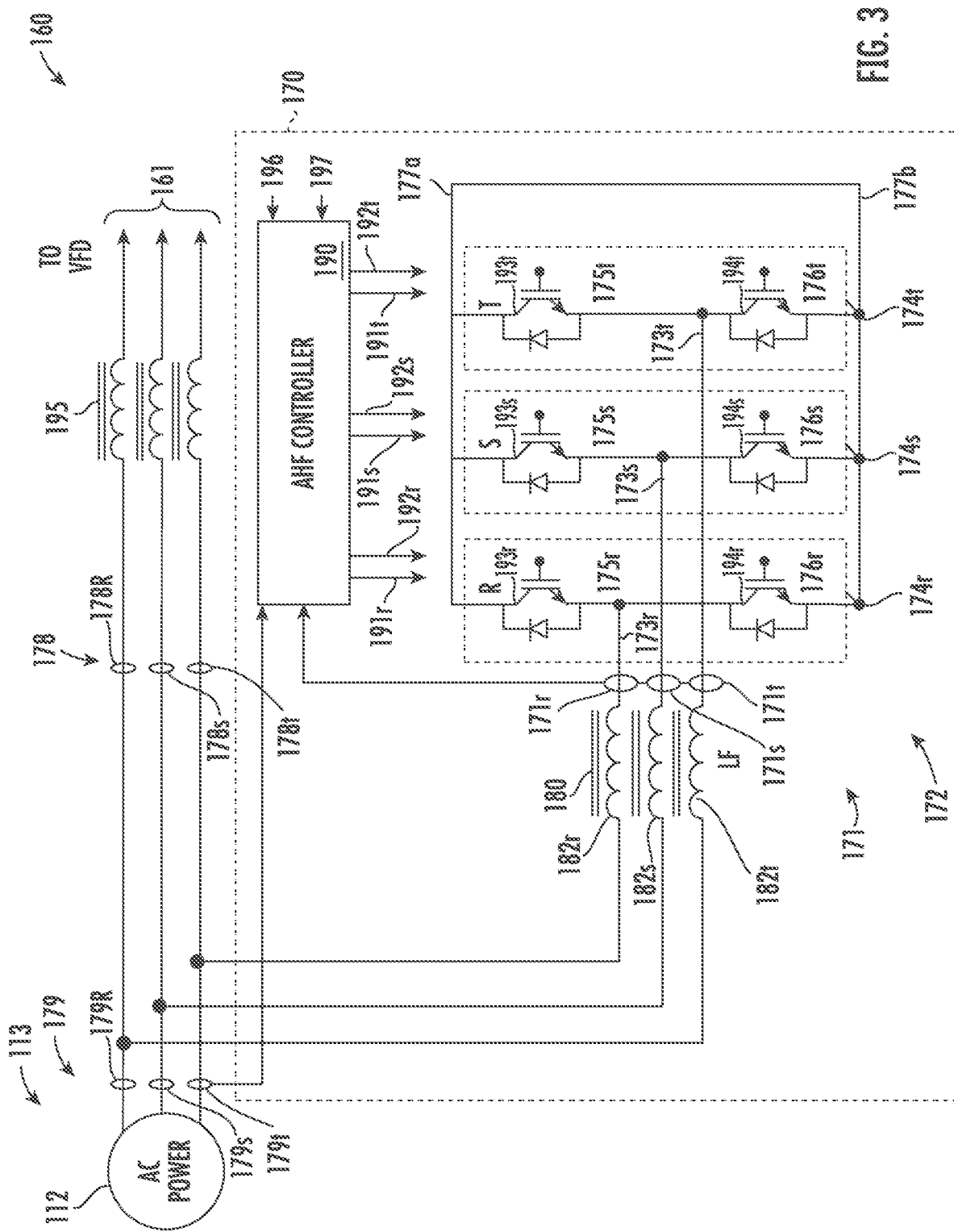
FIG. 3 is a simplified schematic of a three-phase harmonic filter and converter in accordance with an embodiment.

FIG. 3 is an expanded view of the AHF 160 in accordance with an embodiment. The AHF 160 includes an active AHF 170 operably connected in parallel with the AC power 113 and configured to compensate for harmonic distortion caused by a downstream load from being transmitted back to the AC power 113 and ultimately the AC power source 112. In addition, the AHF 160 includes optional passive filter 195 in series with the AC power source 112. The active AHF 170 includes a three-phase boost converter 172 configured with three phase legs shown generally as 174, labeled R, S, and T, also denoted as 174r, 174s, and 174t respectively, each having an output denoted 173r, 173s, and 173t respectively. Each phase leg, R, S, and T, (174r, 174s, and 174t) includes an upper switching devices 175 coupled to a first power supply rail denoted as 177a and a lower switching device 176 coupled to a second supply rail 177b, operating in complementary pairs with the output(s) 173r, 173s, and 173t at the common point of the upper switch device 175 and lower switching device 176. The switching devices 175, 176 are controlled by control signals 192 respectively from an AHF controller 190 to formulate compensation voltages to be added/introduced to the AC power 113.

In an embodiment, the three-phase output current of the AHF 170 is measured by current sensors shown generally as 171, and specifically as 171r, 171s and 171t for each of the phase legs 174r, 174s, and 174t respectively. Similarly, in an embodiment, the three-phase combined current is measured by current sensors shown generally as 178, and specifically as 178r, 178s and 178t for each of the phase legs 174r, 174s, and 174t respectively. Further, the three-phase grid current may be measured by current sensors shown generally as 179, and specifically as 179r, 179s and 179t for each of the phase legs 174r, 174s, and 174t respectively. In an embodiment, the current sensors are inductive current transformers, Hall-Effect devices, and the like, as are conventionally known. The three-phase AC power 113 from the AC power source 112 is connected to the converter 172 via a three-phase inductor 180. The three-phase inductor 180 includes three inductive/reactive elements denoted 182r, 182s, and 182t (e.g., inductors) and then connected to outputs of the three phase legs R, S, and T, (174r, 174s, and 174t) respectively.

As stated previously herein, the AHF 160 may optionally include a passive three-phase filter 195 operably connected in series between the AC power 112 and the output of the hybrid AHF 160, the passive three-phase filter 195 is configured to reduce harmonic currents, limit current transients, stabilize voltage levels and suppress electromagnetic interference (EMI) from being reflected/transmitted back to the AC power source 112. The output of the hybrid AHF 160 is a compensated three-phase AC power 161, which is then connected to the drive system 120 (e.g., a VFD).

In an embodiment, in application of the AHF e.g., 170, the AC power 113 (or 161) is monitored by the AHF controller 190. The AHF controller(s) 190 provides control signals 191r, 191s, 191t to the switching devices 175r, 175s, and 175t of the R, S, and T phase legs 174r, 174s, and 174t respectively. Likewise, the controller 190 also provides control signals 192r, 192s, 192t to the switching devices 176r, 176s, and 176t of the R, S, and T phase legs 174r, 174s, and 174t respectively. The control signals 191r, 191s, 191t are generated by the controller 190 to cause the switching device pairs 175r, 176r, 175s, 176s, and 175t, 176t for each of the respective phase legs 174r, 174s, and 174t of the converter 172 to control the current flowing through the inductances 182r, 182s, and 182t respectively. Thereby, based on voltages/currents introduced on the AC power, e.g., 113, 161, voltages/currents can be induced on each of the respective phases of the AC power 113. The voltages/currents induced are configured to compensate for the harmonics generated by the VFD 120 and the load, e.g., motor 116.

Continuing with FIG. 3, inn an embodiment, the temperature of the switching devices 175r, 175s, and 175t as well as 176r, 176s, and 176t of the R, S, and T phase legs 174r, 174s, and 174t respectively are monitored. Temperature sensors shown generally as 193 and 194 respectively and specifically as 193r, 193s, and 193t as well as lower switching devices 194r, 194s, and 194t are employed on or near each of the mounts, heatsinks and the like for the upper switching devices 175r, 175s, and 175t as well as lower switching devices 176r, 176s, and 176t of the R, S, and T phase legs 174r, 174s, and 174t respectively. The temperature sensors 193, 194 provide temperature signals, shown generally as 196 and 197 respectively to the AHF controller 190 for each upper switching device 175 and lower switching device 175 accordingly. Likewise, the controller 190 may elect monitor the temperatures of the switching devices 175, 176 to ascertain if any of the switching devices 175, 176 is dissipating more power than and another and experiencing unbalanced temperature rise and heating. It should be appreciated that as described herein for the purposes of completeness, the embodiments are described as employing an individual temperature sensor 193 or 194 for each switching device 175 or 176 respectively in each phase leg 174 respectively. Such description is for illustration purposes only. It may be possible to employ only a single temperature sensor 193 for the upper switching devices (e.g., 175), and likewise another 194 for the lower switching devices (e.g., 176). Likewise, the temperature sensors 193, 194 may readily be employed on any of the phase legs 174 without loss of generality. The AHF controller 190 may be implemented using a general-purpose microprocessor executing a computer program stored on a storage medium to perform the operations described herein. Alternatively, controller 190 may be implemented in hardware (e.g., ASIC, FPGA) or in a combination of hardware/software.

It will be appreciated that in an embodiment, by employing the AHF 160 as described with both a parallel configured AHF 170 and optional integral series connected in passive three-phase filter or reactor 195 facilitates improvement in motor drive 120 (e.g., VFD) function, performance, and cost effectiveness. In particular, the described embodiments of the hybrid AHF 160 permit operation of existing motor drives 120 (e.g., VFD's) in applications beyond their nominal current ratings for power, in-rush current, and harmonic distortion. Therefore for selected applications use of a hybrid AHF 160 and a conventional motor drive 120 facilitates satisfying system requirements without having to select and resort to higher nominal current rated motor drives. As will be appreciated as the current rating of a motor drive (e.g., motor drive or VFD) is increased, the cost, size and complexity significantly increase. The described embodiments provide system designers an opportunity to implement lower cost systems that exhibit improved performance and yet reduced cost. Moreover, the described embodiments facilitate applications in retrofit applications that may permit existing motor drives 120 (e.g., an existing VFD) to be operated in applications beyond prior or existing requirements, particularly harmonic current requirements.

Conventionally a pulse width modulation (PWM) control scheme is employed to command the switching devices 175r, 176r; 175s, 176s; and 175t 176t of the R, S, and T phase legs 174r, 174s, and 174t respectively of the controller 190. Conventionally, such a PWM control scheme employs space vector pulse width modulation SVPWM techniques for the controller 190. However, in some applications, other PWM techniques may be employed to address the advantages and constraints of a given AHF 170 configuration. For example, the reduction of switching losses for the switching devices e.g., 175r; 175s; and 175t as well as 176r; 176s; and 176t of the R, S, and T phase legs 174r, 174s, and 174t of the controller 190. In certain configurations, some PWM techniques are less suitable than others. Still further, while it is well known that increasing switching frequency facilitates reductions in the size of magnetics, filters, improves acoustics, and the like, it also usually results in increased switching losses in the switching devices of the inverter 50 and/or controller 190, e.g., 175r, 176r; 175s, 176s; and 175t 176t. Therefore, in some embodiments, it may be advantageous to operate the AHF switching devices 175r, 176r; 175s, 176s; and 175t 176t at a different (e.g., higher/lower) PWM frequency than in other applications.

As a result, while SVPWM is effective for most applications, it is, somewhat less efficient. Conversely, employing conventional discontinuous (DPWM) improves efficiency, but makes acoustic noise and creates more PWM ripple that potentially hinders current sensing quality in some sensors. For example, in some embodiments, Hall-effect based non-contact current sensors are employed than may not operate as well when employing DPWM. DPWM causes selected switching devices e.g., 175r, 176r; 175s, 176s; and 175t 176t) (upper and lower) to turn on and stay on under selected conditions. DPWM is a switching method that achieves the same line to line average voltage with reduced switching by stopping a continuous switching pattern to a occasionally stop switching patent when currents are potentially large In DPWM the switching devices are selected to stay on continuously and thereby adding a common mode voltage to each phases (R, S, T) at the switching device being commanded. However, DPWM, can be used in some applications to save power, but the expense of current sensing quality and increased acoustic noise. In general, applications employing DPWM exhibit efficiencies on the order of 30% improved over the same AHF employing SVPWM.

Hybrid SVPWM is effectively a combination or hybrid of SVPWM and DPWM techniques. Hybrid SVPWM allows the lower switching device(s) (e.g., 176r, 176s, 176t to be ON, i.e., switching, for a more prolonged time (e.g., on the order of about ⅔ of the AC voltage cycle), but it also includes a period of time where the lower switching devices 176r, 176s, 176t are off facilitating reduced switching losses. The reduced switching losses are achieved due to the switching being interrupted (e.g., approximately ⅓ of an AC voltage cycle). Hence, in an embodiment the base PWM switching scheme in the controller 190 is hybrid SVPWM, when it is possible, while at peak AHF current loading the control scheme transitions to DPWM. In addition, for the controller 190, continuous SVPWM or hybrid SVPWM techniques are employed to ensure good harmonic current control. In applications where current control is less critical and efficiency is more important, techniques to reduce switching losses and improve efficiency in accordance with an embodiment are employed.

Hybrid DPWM (HPWM) is a variation of DPWM where under selected conditions either the upper switching devices e.g., 175r, 175s, and 175t, or the lower switching devices e.g., 176r, 176s, and 176t are commanded fully on for an extended duration (relative to the PWM frequency). When applicable to the upper switching devices e.g., 175r, 175s, and 175t, it is referred to as "glued to top rail" and denoted DPWM_1. When applicable to the lower switching devices e.g., 176r, 176s, and 176t it is referred to as "glued to the bottom rail" and denoted DPWM_0. DPWM_1 and DPWM_0 are similar to conventional DPWM, though DPWM is the most efficient but also the most noise producing. DPWM_1 or DPWM_0 are more efficient than SVPWM but not as efficient as DPWM. DPWM_1 or DPWM_0 also exhibit better ripple characteristics (acoustic noise & electrical noise impact) than the DPWM, at unity power factor conditions that can nearly match performance of standard SVPWM.

Selection of the type of modulation to employ depends on various factors in the control of the AHF 170. In an embodiment, the selection is an optimization and balance between controller efficiency (i.e., reduced switching losses in the switching devices e.g., 175r, 175s 175t, 176r, 176s, and 176t and controller noise, ripple, and the like. For example, if the best possible efficiency is desired, it may be best to employ DPWM and tolerate the noise generated, particularly if it can be maintained below a certain level for a given operating condition such as full load, high modulation index conditions. Moreover, if it is desired to control efficiency moderately well, but with not much noise, then DPWM_0 or DPWM_1 or alternating between DPWM_0 and DPWM_1 would prove to be more advantageous and a more desirable choice. Hence, in an embodiment, the base PWM switching scheme in the controller 190 is DPWM_0 or DPWM_1 or alternating in time between DPWM_0 and DPWM_1, while at peak harmonic currents the control scheme transitions to DPWM to achieve the highest potential efficiency. In an embodiment, the PWM strategy employed is to operate in a hybrid discontinuous PWM strategy selectively alternating between DPWM_0 and DPWM_1 at selected intervals. For example, in an embodiment the AHF controller 190 alternates between DPWM_0 and DPWM_1 to distribute or equalize any heating of the switching devices therein. For example, the controller could alternate intervals as short as a fraction of a second or even as long as many minutes. In an embodiment, an interval of one second is employed, in another embodiment, an interval of 10 minutes is employed.

In particular, under selected conditions depending on an operating characteristic of the AHF 170, the PWM scheme employed for the controller 190 is switched from a more conventional SVPWM or hybrid SVPWM to a hybrid discontinuous PWM strategy such as DPWM_0 or DPWM_1 or alternating between DPWM_0 and DPWM_1. Moreover, the PWM scheme may further be switched from a hybrid discontinuous PWM strategy such as, DPWM_0, DPWM_1, or alternating between DPWM_0 and DPWM_1 to a discontinuous PWM (DPWM) strategy under selected conditions. More specifically, under selected conditions, for example if the current load on the AHF 170 is highest, e.g., full load, starting, load transients, emergency conditions of the motor 16, or the heating of the upper switching devices 175 or lower switching devices 176 is unbalanced, DPWM may be employed to achieve lower switching losses. The load conditions, output currents and grid currents may be monitored by currents sensors 171, 178, 179 for each of their respective locations to aid in determining loading conditions, harmonic currents and the like to facilitate the selection of a given PWM strategy. Likewise, the heating and temperatures of the switching devices 175, 176 respectively may be monitored by temperature sensors 193, 194 for each of the respective switching devices 175, 176 to facilitate the selection of a given PWM strategy. Employing DPWM reduces the switching losses in the switching devices 175r, 176r; 175s, 176s; and 175t 176t of the R, S, and T phase legs 174r, 174s, and 174t respectively. Reductions in switching losses improves power efficiency and thereby enables higher power densities and enables higher operating powers and facilitates downsizing of expensive power components such as the switching devices 175r, 176r; 175s, 176s; and 175t 176t of the R, S, and T phase legs 174r, 174s, and 174t. However, once the highest load/worst heating conditions have been satisfied, the noise (acoustic or electrical) characteristics of DPWM may outweigh its efficiency benefits. Under such conditions, the controller 190 may switch to any one of the hybrid discontinuous PWM strategies such as, DPWM_0, DPWM_1, or alternating between DPWM_0 and DPWM_1. Further still, if the efficiency is of lower importance, and yet noise reduction, ripple control, and harmonic precision becomes more paramount, e.g., perhaps under specific lower current operating conditions, then once again, the controller 190 may elect to move to a hybrid SVPWM or SVPWM strategy sacrificing some efficiency for the benefit of the improved noise and response. In the described embodiments, DWPM is about 30% more efficient than SVPWM, while DWPM-0 or DPWM_1 are about 25% more efficient than standard SVPWM.

The described embodiments advantageously employ a variety of PWM strategies over a selected portions of the operational range of the AHF 170 and the VFD 120 and selectively switches to different PWM strategies for instances of higher current loading or heating, thereby providing potentially optimal AHF output current rating during selected high current loading conditions. This, in turn, allows a given AHF 120 or other power conversion system to be used with minimal output limitations on motor acceleration or derating penalty in situations in which available input voltages may not be sufficient for the drive 120 or there is excessive current in filter magnetics. The present disclosure thus includes embodiments that provide intelligent balancing of operation at or above component rating under selected operating conditions in the power conversion system 10, in this case, a filter magnetic current rating at an acceptable operating point with respect to thermal stress on the inductor core structures, and more specifically a pulse width modulation strategy to reduce harmonic filter switching device switching losses. As a result, improved power performance is achieved.

Figure 4A:
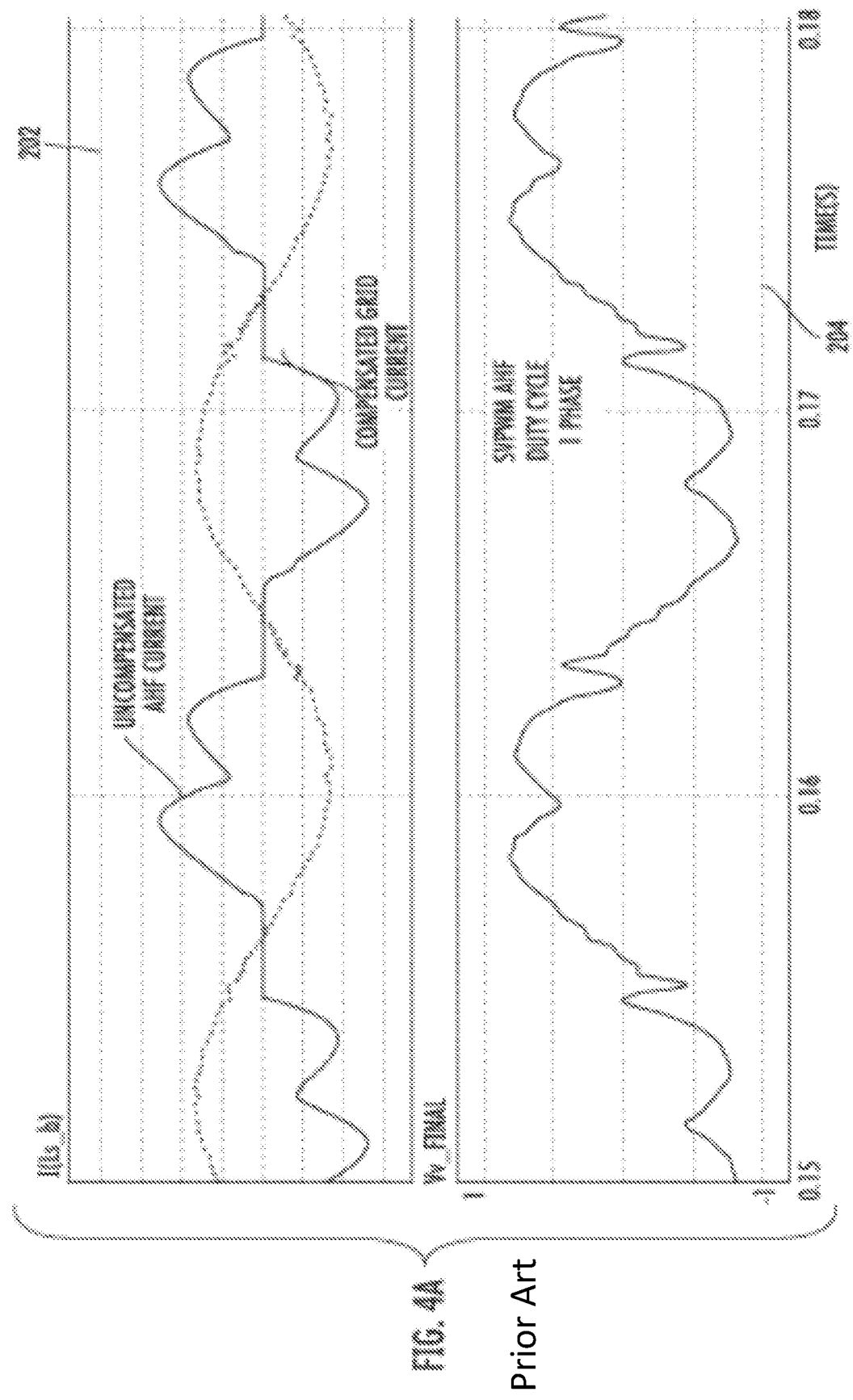
FIG. 4A is diagram and graphs of an AHF correction current, the compensated three-phase current, and a PWM waveform of conventional SVPWM in accordance with an embodiment.

Referring also to FIGS. 4A-4E, which further illustrate graphs 202-216 showing operation of certain embodiments of the controller 190 in which a PWM technique is provided by the controller 190. FIG. 4A illustrates an exemplary graph 202 showing time based waveforms of the VFD current with resulting harmonics and the compensated grid current when employing conventional SVPWM as may commonly be employed in a AHF controller 190. In an embodiment the conventional SVPWM is employed and results in a voltage waveform for one of the phase legs e.g., 174r, 174s, and 174t as depicted in graph 204. FIG. 4B at graph 206, depicts the same currents and results achieved employing DPWM as the PWM scheme in the AHF 170. Graph 208 depicts where the switching is stopped in each of the phase legs switching devices 175r, 176r; 175s, 176s; and 175t 176t of the R, S, and T phase legs 174r, 174s, and 174t respectively under selected conditions. For example, in reference to the figures, when the signal indicates −1, it means that the lower switching device e.g., 176r for the R phase leg 174r, is fully (100%) on/conducting while the top switching device, e.g., 175r for that leg (e.g., 174r) is fully off during the PWM period. Conversely, when the signal indicates 1, it means that the bottom switching device e.g., 176r for the R phase leg 174r, is fully turned off while the top switching device e.g., 175r for that leg (e.g., 174r) is fully on during the PWM period. If the signal is between −1 & 1, then the switching device pairs e.g., 175r, 176r for the R phase leg 174r toggle twice within the PWM period.

FIG. 4B in graph 208 depicts a single phase of a three-phase waveforms employing discontinuous pulse width modulation (DPWM) which clamps the carrier at the maximal or minimal levels (e.g., +1.0 and −1.0 in this example) and thereby the outputs of the switching devices 175r, 176r; 175s, 176s; and 175t 176t of the R, S, and T phase legs 174r, 174s, and 174t respectively, over an angular range constituting the DPWM angle 220. In this embodiment, the DPWM angle 220 is provided by the controller 190 based on the loading and harmonic current requirements of the AHF 170. In addition, the controller 190 selectively adjusts the DPWM angle/duration based on the loading requirements for the AHF 170, to avoid excessive harmonic currents, and yet to stay within the current ratings of the switching devices 175r, 176r; 175s, 176s; and 175t 176t.

Figure 4C:
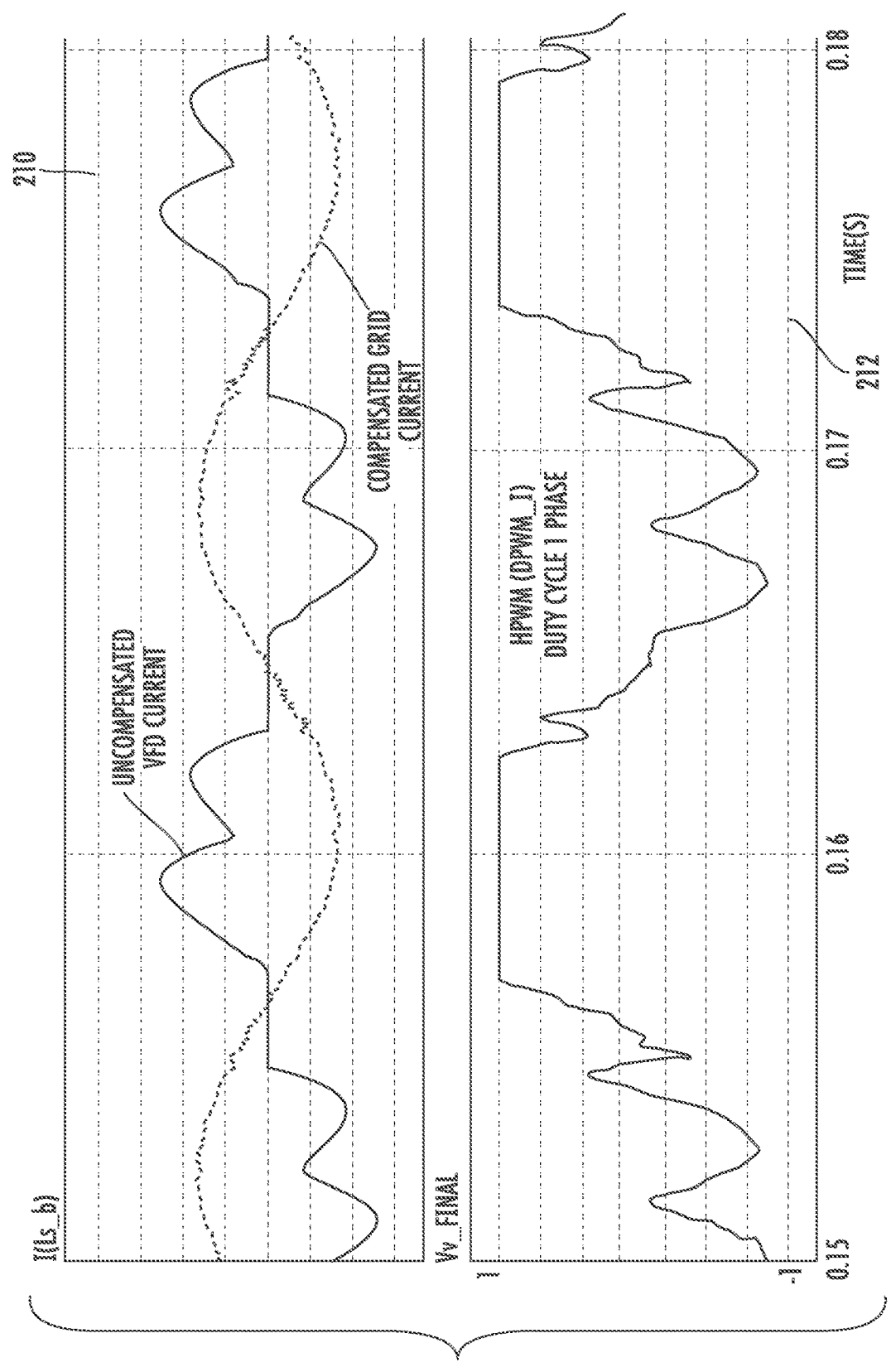
FIG. 4C is diagram and graph of an AHF correction current, the compensated three-phase current, and a PWM waveform of conventional DPWM_1 in accordance with an embodiment.
Figure 4D:
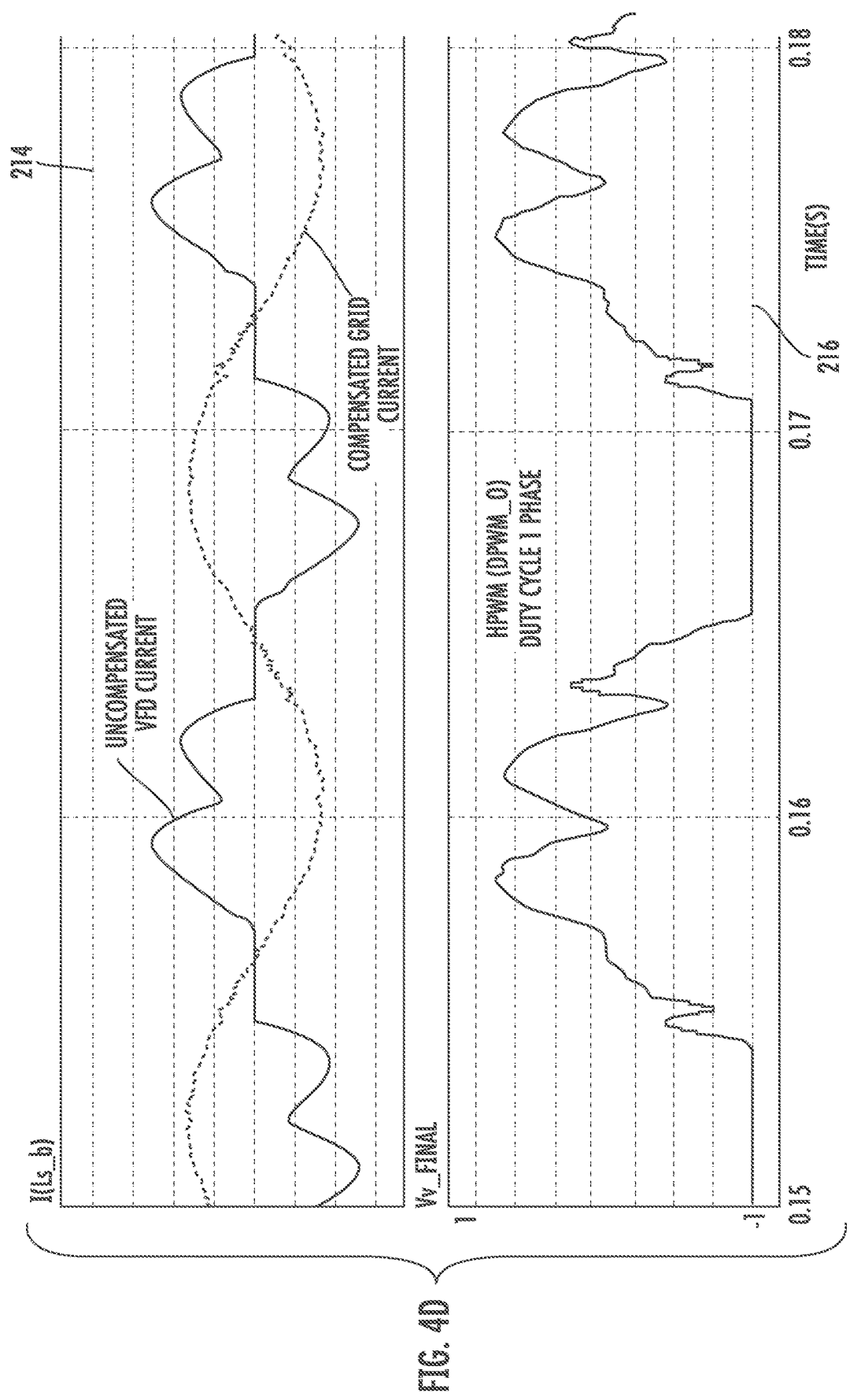
FIG. 4D is diagram and graph of an AHF correction current, the compensated three-phase current, and a PWM waveform of conventional DPWM_0 in accordance with an embodiment.

FIG. 4C illustrates an exemplary graph 210 showing time based waveforms of the VFD current to be compensated and the compensated grid current employing DPWM_1 as the PWM strategy as may be employed in a motor drive controller 190. In an embodiment when DPWM_1 is employed it results in a voltage waveform for one of the phase legs e.g., 174r, 174s, and 174t as depicted in graph 212. Likewise FIG. 4D at graph 214, depicts the VFD currents and compensated grid current achieved employing DPWM_0 as the PWM scheme in the AHF 170 while graph 216 depicts the switching is stopped in each of the phase legs switching devices 175r, 176r; 175s, 176s; and 175t 176t of the R, S, and T phase legs 174r, 174s, and 174t respectively under selected conditions.

Figure 4E:
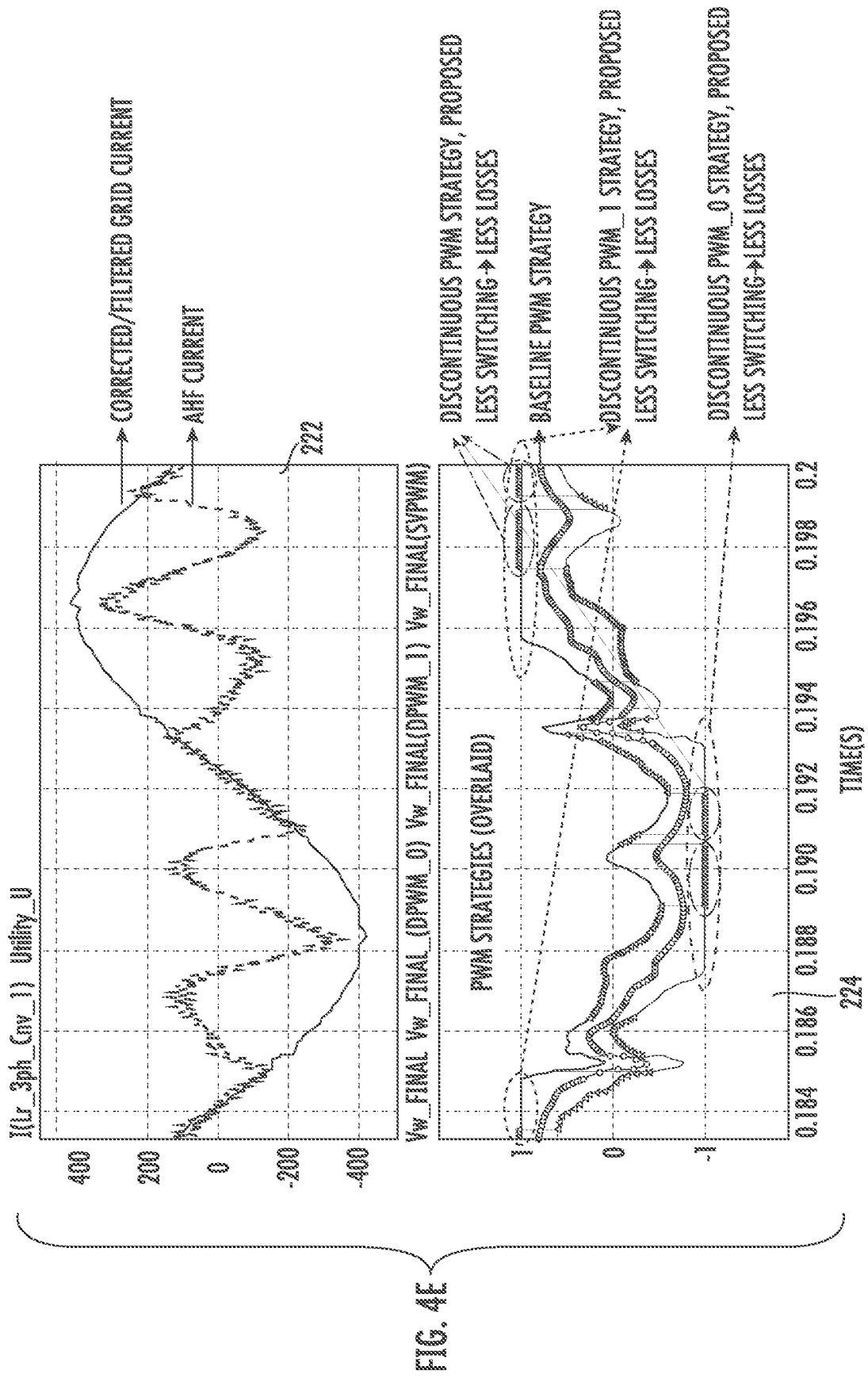
FIG. 4E is diagram and graph of an AHF correction current, the compensated three-phase current, and a PWM waveform of a combination of PWM strategies in accordance with an embodiment.

Finally, FIG. 4E illustrates exemplary graphs 222 and 224 showing time based waveforms employing each of the PWM techniques as may commonly be employed in a AHF controller 190. Graph 222 in this instance depicts the compensating AHF current generated and the resultant current based on the injection from the AHF 170. Graph 224 depicts an overlay of the various PWM techniques as applied over a duration of time including conventional SVPWM, DPWM, as well as DPWM_0 and DPWM_1. From the figure, it can be seen that under selected condition (such as a selected level of AHF current as seen in graph 222, different PWM techniques are employed.

Figure 5:
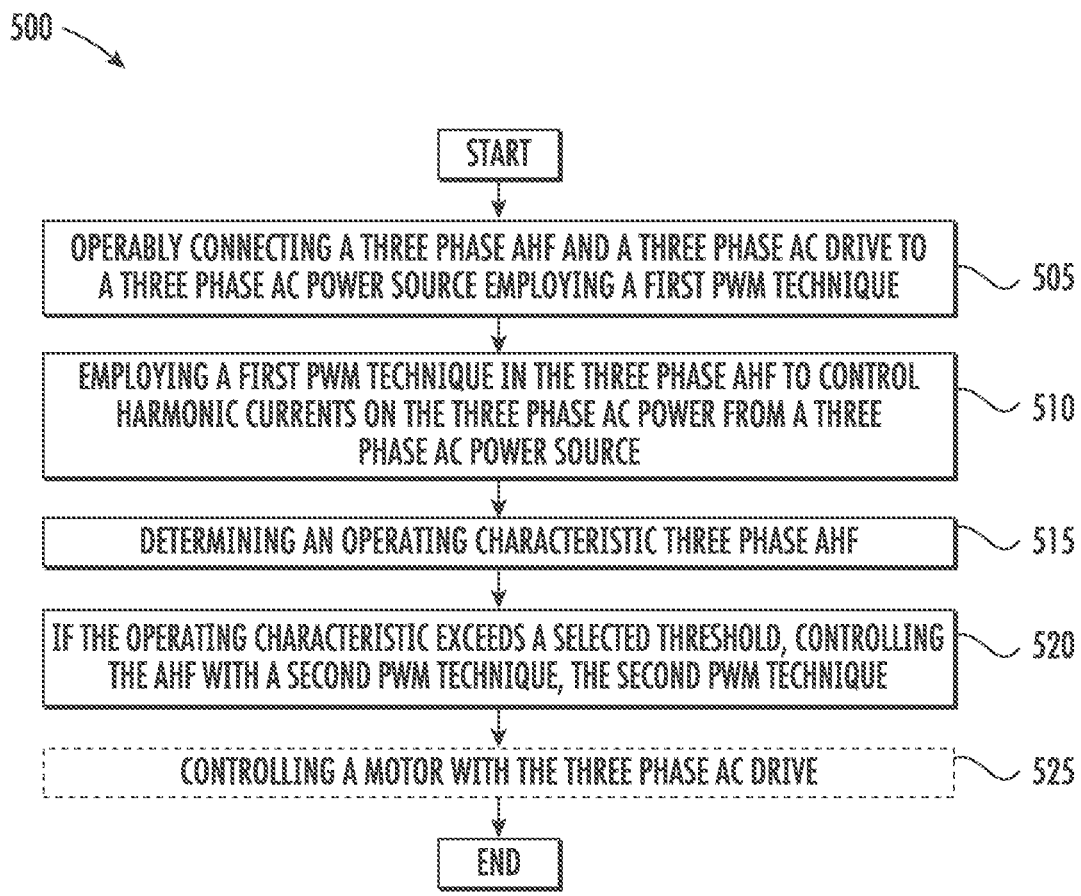
FIG. 5 depicts a flowchart of a method of controlling is a three-phase regenerative drive employing multiple converter PWM strategies in accordance with an embodiment.

Turning now to FIG. 5, where a control methodology 500 for the drive 120 is depicted. For simplicity, reference is made to drive 120 of FIG. 2 and its various elements, while it should be appreciated the description may be equally applicable to the other embodiments employing different drive configurations. In the various embodiments, reference will be made to PWM strategies employed by the controller 190 based at least in part on the requirements of the drive 120. In an embodiment, the controller 190 is configured to implement one or more PWM strategies operate the R, S, and T phase legs 174r, 174s, and 174t in a conventional manner, but with controller 190 injecting currents into the AC power 113 from the AC power source 112. The switching devices 175r, 176r; 175s, 176s; and 175t, 176t operating at the PWM frequency, e.g., on the order of 8-16 kHz as is conventionally understood. It should be appreciated that in some embodiments the control scheme for the controller 190 may be linked to the control scheme of the converter 130 or inverter 150. The control scheme employed may depend on the particular drive topology employed, the configuration of the system and selected design constraints.

Continuing with FIG. 5, the method 500 initiates at process step 505 with connecting the three-phase AHF 160 to a three-phase drive 120 of FIG. 2 to a three-phase AC source 112 as described herein. At process step 510 the method 500 includes controlling the switching devices 175r, 176r; 175s, 176s; 175t, 176t; of the R, S, and T phase legs 174r, 174s, and 174t of the AHF 170 via the controller 190 with a selected PWM strategy. In an embodiment, SVPWM may be an initial selection. As discussed herein, the switching devices 175r, 176r; 175s, 176s; 175t, 176t; of the R, S, and T phase legs 174r, 174s, and 174t are controlled in an manner to generate and inject currents into the AC power 113 from the AC source 112 and direct it to the drive 120 to ensure that harmonic distortion is controlled. At process step 515 a characteristic of the controller 190 and/or the AHF 170 is monitored. In one embodiment, the characteristic may be the current loading on AHF 170 is determined by monitoring via current sensors 171r, 171s, 171t, the phase currents from the three phase legs 174r, 174s, and 174t respectively as depicted at process step 515. Alternatively, the current sensors 178r, 178s, 178t or 179r, 179s, 179t could be employed. In another embodiment, the operating characteristic could be a temperature associated with one or more of the switching devices 175, 175 of the AHF 170. In another embodiment, the operating characteristic may be any parameter associated with operating the AHF, or the system 100. Continuing the method 500, at process step 520, if the operating characteristic (e.g., current load, switching device heating, and the like) on the AHF 170 exceeds a selected threshold, the then PWM control technique for the controller 190 transitions to another PWM technique as depicted at process step 520. For example, in an embodiment, DPWM_0, DPWM_1 or the combination of the two may be employed particularly to employ a PWM technique that is more efficient. In an embodiment, the selected threshold may be based on at least one of AHF total RMS current exceeding above a nominal rating, or a temperature of any switching device exceeding a selected maximum design value. Transitioning to DPWM reduces switching losses in the AHF switching devices 175r, 176r; 175s, 176s; 175t, 176t facilitating more efficient operation. Continuing with the method 500, as depicted at process step 525, optionally the drive may include generating control signals for the switching devices 175r, 176r; 175s, 176s; 175t, 176t.

Therefore, it should be understood and appreciated a technical effect of the described embodiments includes changing the PWM scheme from one PWM scheme to a second, which improves AHF function in terms of losses and overall efficiency. The change may at times be at the expense of acoustic noise and/or current distortion to levels that may be acceptable in some applications. However, it is also desirable to employ SVPWM under selected conditions to reduce current distortion/acoustic noise, and provide improved balanced thermal distribution of switching devices over the hybrid PWM or DPWM for acoustically sensitive applications.

The terminology used herein is for the purpose of describing particular embodiments only and is not intended to be limiting. While the description has been presented for purposes of illustration and description, it is not intended to be exhaustive or limited to the form disclosed. Many modifications, variations, alterations, substitutions, or equivalent arrangement not hereto described will be apparent to those of ordinary skill in the art without departing from the scope of the disclosure. Additionally, while the various embodiments have been described, it is to be understood that aspects may include only some of the described embodiments. Accordingly, embodiments are not to be seen as being limited by the foregoing description, but is only limited by the scope of the appended claims.

What is claimed is:

1. A three-phase active harmonic filter (AHF) employing multiple pulse width modulation (PWM) strategies, the filter comprising:
    a three-phase converter having inputs for connection to a three-phase AC source, the three-phase converter having three phase legs, wherein each phase leg of the three phase legs of the three-phase converter includes a first switching device operably connected to a first power supply rail and a second switching device operably connected to a second supply rail;
    a controller operably connected to the three-phase converter, the controller configured to:
        determine an operational characteristic of the AHF and operable to control the first and second switching devices of each phase leg of the three phase legs with a first PWM strategy;
        compare the operational characteristic on the AHF to a selected threshold; and
        employ a second PWM strategy if the operational characteristic exceeds a selected threshold;
    wherein, the first PWM strategy is one of space vector PWM (SVPWM), Discontinuous (DPWM), a first hybrid discontinuous PWM (DPWM_1), a second hybrid discontinuous PWM (DPWM_0), an alternating combination of the DPWM_1 and the DPWM_0
    wherein, the first hybrid discontinuous PWM (DPWM_1) includes the second switching device is fully turned off while the first switching device is fully turned on during the PWM period for a selected phase leg, and the second hybrid discontinuous PWM (DPWM_0) includes the first switching device is fully turned off while the second switching device is fully on during the PWM period for a selected phase leg.

2. The three-phase active harmonic filter (AHF) of claim 1 wherein, the second PWM strategy is another of the space vector PWM (SVPWM), the Discontinuous (DPWM), the first hybrid discontinuous PWM (DPWM_1), the second hybrid discontinuous PWM (DPWM_0), the alternating combination of the DPWM_1 and the DPWM_0.

3. The three-phase active harmonic filter (AHF) of claim 1 wherein the operational characteristic includes at least one of a harmonic current loading on the AHF and a temperature of a switching device in the AHF.

4. The three-phase active harmonic filter (AHF) of claim 1 wherein the three-phase converter inputs are configured for connection to the three-phase AC source in electrical parallel.

5. A three-phase active harmonic filter (AHF) employing multiple pulse width modulation (PWM) strategies, the filter comprising:
    a three-phase converter having inputs for connection to a three-phase AC source, the three-phase converter having three phase legs, wherein each phase leg of the three phase legs of the three-phase converter includes a first switching device operably connected to a first power supply rail and a second switching device operably connected to a second supply rail;
    a controller operably connected to the three-phase converter, the controller configured to:
        determine an operational characteristic of the AHF and operable to control the first and second switching devices of each phase leg of the three phase legs with a first PWM strategy;
        compare the operational characteristic on the AHF to a selected threshold; and
        employ a second PWM strategy if the operational characteristic exceeds a selected threshold;
    wherein, the second PWM strategy is another of the space vector PWM (SVPWM), the Discontinuous (DPWM), the first hybrid discontinuous PWM (DPWM_1), the second hybrid discontinuous PWM (DPWM_0), the alternating combination of the DPWM_1 and the DPWM_0;
    wherein, the alternating the combination of the DPWM_1 and the DPWM_0 is based on a time duration associated with the three-phase AC power.

6. The three-phase active harmonic filter (AHF) of claim 5 wherein, the first PWM strategy is one of space vector PWM (SVPWM), Discontinuous (DPWM), a first hybrid discontinuous PWM (DPWM_1), a second hybrid discontinuous PWM (DPWM_0), an alternating combination of the DPWM_1 and the DPWM_0.

7. A three-phase active harmonic filter (AHF) employing multiple pulse width modulation (PWM) strategies, the filter comprising:
   a three-phase converter having inputs for connection to a three-phase AC source, the three-phase converter having three phase legs, wherein each phase leg of the three phase legs of the three-phase converter includes a first switching device operably connected to a first power supply rail and a second switching device operably connected to a second supply rail;
   a controller operably connected to the three-phase converter, the controller configured to:
      determine an operational characteristic of the AHF and operable to control the first and second switching devices of each phase leg of the three phase legs with a first PWM strategy;
      compare the operational characteristic on the AHF to a selected threshold; and
      employ a second PWM strategy if the operational characteristic exceeds a selected threshold;
   wherein the selected threshold is based on at least one of AHF total RMS current exceeding above a nominal rating, or a temperature of any switching device exceeding a selected maximum design value.

8. A three-phase motor control system with an active harmonic filter employing multiple pulse width modulation (PWM) strategies, the motor control system comprising:
   a three-phase variable frequency drive operably connected to a three-phase AC power source;
   a motor operably connected to the three-phase variable frequency drive, the three-phase variable frequency drive configured to formulate and provide command signals to the motor; and
   a three-phase active harmonic filter operably connected to the three-phase AC power source, the three-phase active harmonic filter employing a plurality of PWM strategies;
   wherein the three-phase active harmonic filter includes:
   a three-phase converter having inputs for connection to the three-phase AC source, the three-phase converter having three phase legs, wherein each phase leg of the three phase legs of the three-phase converter includes a first switching device operably connected to a first power supply rail and a second switching device operably connected to a second supply rail;
   a controller operably connected to the three-phase converter, the controller configured to:
      determine an operational characteristic of the AHF and operable to control the first and second switching devices of each phase leg of the three phase legs with a first PWM strategy;
      compare the operation characteristic of the AHF to a selected threshold; and
      employ a second PWM strategy if the operational characteristic exceeds a selected threshold;
   wherein, the first PWM strategy is one of space vector PWM (SVPWM), Discontinuous (DPWM), a first hybrid discontinuous PWM (DPWM_1), a second hybrid discontinuous PWM (DPWM_0), an alternating combination of the DPWM_1 and the DPWM_0;
   wherein, the first hybrid discontinuous PWM (DPWM_1), includes the second switching device is fully turned off while the first switching device is fully turned on during the PWM period for a selected phase leg, and the second hybrid discontinuous PWM (DPWM_0) includes the first switching device is fully turned off while the second switching device is fully turned on during the PWM period for a selected phase leg.

9. The three-phase motor control system of claim 8 wherein, the second PWM strategy is another of the space vector PWM (SVPWM), the Discontinuous (DPWM), the first hybrid discontinuous PWM (DPWM_1), the second hybrid discontinuous PWM (DPWM_0), and the alternating combination of the DPWM_1 and the DPWM_0.

10. The three-phase motor control system of claim 8 wherein the operational characteristic includes at least one of a harmonic current loading on the AHF and a temperature of a switching device in the AHF.

11. A three-phase motor control system with an active harmonic filter employing multiple pulse width modulation (PWM) strategies, the motor control system comprising:
   a three-phase variable frequency drive operably connected to a three-phase AC power source;
   a motor operably connected to the three-phase variable frequency drive, the three-phase variable frequency drive configured to formulate and provide command signals to the motor; and
   a three-phase active harmonic filter operably connected to the three-phase AC power source, the three-phase active harmonic filter employing a plurality of PWM strategies;
   wherein the three-phase active harmonic filter includes:
   a three-phase converter having inputs for connection to the three-phase AC source, the three-phase converter having three phase legs, wherein each phase leg of the three phase legs of the three-phase converter includes a first switching device operably connected to a first power supply rail and a second switching device operably connected to a second supply rail;
   a controller operably connected to the three-phase converter, the controller configured to:
      determine an operational characteristic of the AHF and operable to control the first and second switching devices of each phase leg of the three phase legs with a first PWM strategy;
      compare the operation characteristic of the AHF to a selected threshold; and
      employ a second PWM strategy if the operational characteristic exceeds a selected threshold;
   wherein, the first PWM strategy is one of space vector PWM (SVPWM), Discontinuous (DPWM), a first hybrid discontinuous PWM (DPWM_1), a second hybrid discontinuous PWM (DPWM_0), an alternating combination of the DPWM_1 and the DPWM_0;
   wherein, the alternating the combination of the DPWM_1 and the DPWM_0 is based on a time duration associated with the three-phase AC power.

12. A three-phase motor control system with an active harmonic filter employing multiple pulse width modulation (PWM) strategies, the motor control system comprising:
   a three-phase variable frequency drive operably connected to a three-phase AC power source;
   a motor operably connected to the three-phase variable frequency drive, the three-phase variable frequency drive configured to formulate and provide command signals to the motor; and
   a three-phase active harmonic filter operably connected to the three-phase AC power source, the three-phase active harmonic filter employing a plurality of PWM strategies;

a filter interposed between the three-phase AHF and the three-phase variable frequency drive.

13. A three-phase motor control system with an active harmonic filter employing multiple pulse width modulation (PWM) strategies, the motor control system comprising:
- a three-phase variable frequency drive operably connected to a three-phase AC power source;
- a motor operably connected to the three-phase variable frequency drive, the three-phase variable frequency drive configured to formulate and provide command signals to the motor; and
- a three-phase active harmonic filter operably connected to the three-phase AC power source, the three-phase active harmonic filter employing a plurality of PWM strategi;
- wherein the selected threshold is based on at least one of AHF total RMS current exceeding above a nominal rating, or a temperature of any switching device exceeding a selected maximum design value.

* * * * *